June 1, 1965 W. E. BELL 3,187,251

QUANTUM OSCILLATORS

Filed Feb. 21, 1962 2 Sheets-Sheet 1

INVENTOR.
WILLIAM E. BELL

BY [signature]

ATTORNEY

INVENTOR.
WILLIAM E. BELL
BY
Wm J Nolan
ATTORNEY

United States Patent Office 3,187,251
Patented June 1, 1965

3,187,251
QUANTUM OSCILLATORS

William E. Bell, Palo Alto, Calif., assignor to Varian Associates, Palo Alto, Calif., a corporation of California Filed Feb. 21, 1962, Ser. No. 174,840
12 Claims. (Cl. 324—.5)

The present invention relates in general to precision oscillators whose operation is governed by quantum mechanical transitions, and more particularly to quantum oscillators utilizing the detection of optical radiation which is modulated by interaction with a medium undergoing such transitions.

Recently, it has been discovered that when a beam of optical radiation interacts with a medium undergoing coherent quantum transitions and is subsequently intercepted by a photo-detector, the photodetector can generate a signal at a frequency determined by the frequency of said transitions. By feeding this photodetector signal back to the medium the transitions may thus become self-sustaining and establish oscillation at the transition frequency. For a detailed explanation of the phenomena involved, reference is made to 105 Physical Review, 1924 (March 15, 1957), 107 Physical Review 1559 (September 15, 1957) and U.S. patent application Serial No. 653,180, filed April 16, 1957, now U.S. Patent 3,150,313, and assigned to applicant's assignee.

One important application of such oscillators is in the measurement of magnetic field intensities, the oscillator being operated on a transition whose frequency is a linear function of this intensity. Another application is as a frequently standard, in which case a transition whose frequency is substantially independent of magnetic field intensity is preferably used. Since all quantum transitions have a finite linewidth, precise results in applications of this type require that the frequency of oscillation depend only on the line center or resonance frequency.

In practice, it is difficult to maintain the phase shift through each element in the closed oscillator loop constant during operation. This is particularly the case for magnetometer applications in which the oscillator may be required to operate over a wide range of frequencies and in various orientations. As a consequence, undesired deviations of the oscillation frequency from the resonance frequency may result. It is an object of the present invention to provide a novel compensation technique for eliminating such frequency deviations.

One feature of the present invention is the provision of means responsive to the average intensity of optical radiation passing through the quantum resonant sample for stabilizing the frequency of self-oscillation at the resonance frequency.

Another feature of the present invention is the provision of means in accordance with the previous paragraph including a phase-variable circuit in the oscillation loop which is controlled in accordance with said average radiation intensity.

Still another feature of the present invention is the provision of means in accordance with the second preceding paragraph wherein the stabilizing signal is obtained by phase modulating the self-oscillation.

Figure 1:
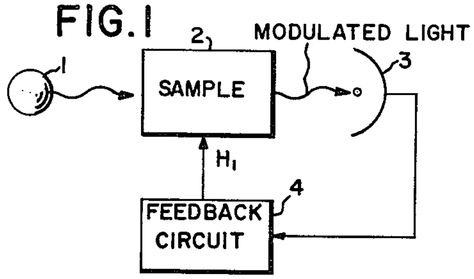
Figure 2:
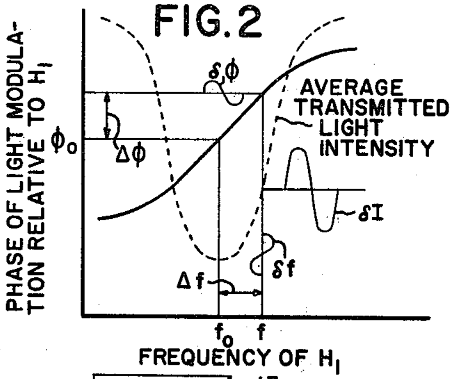
Figures 3, 3A, 4:
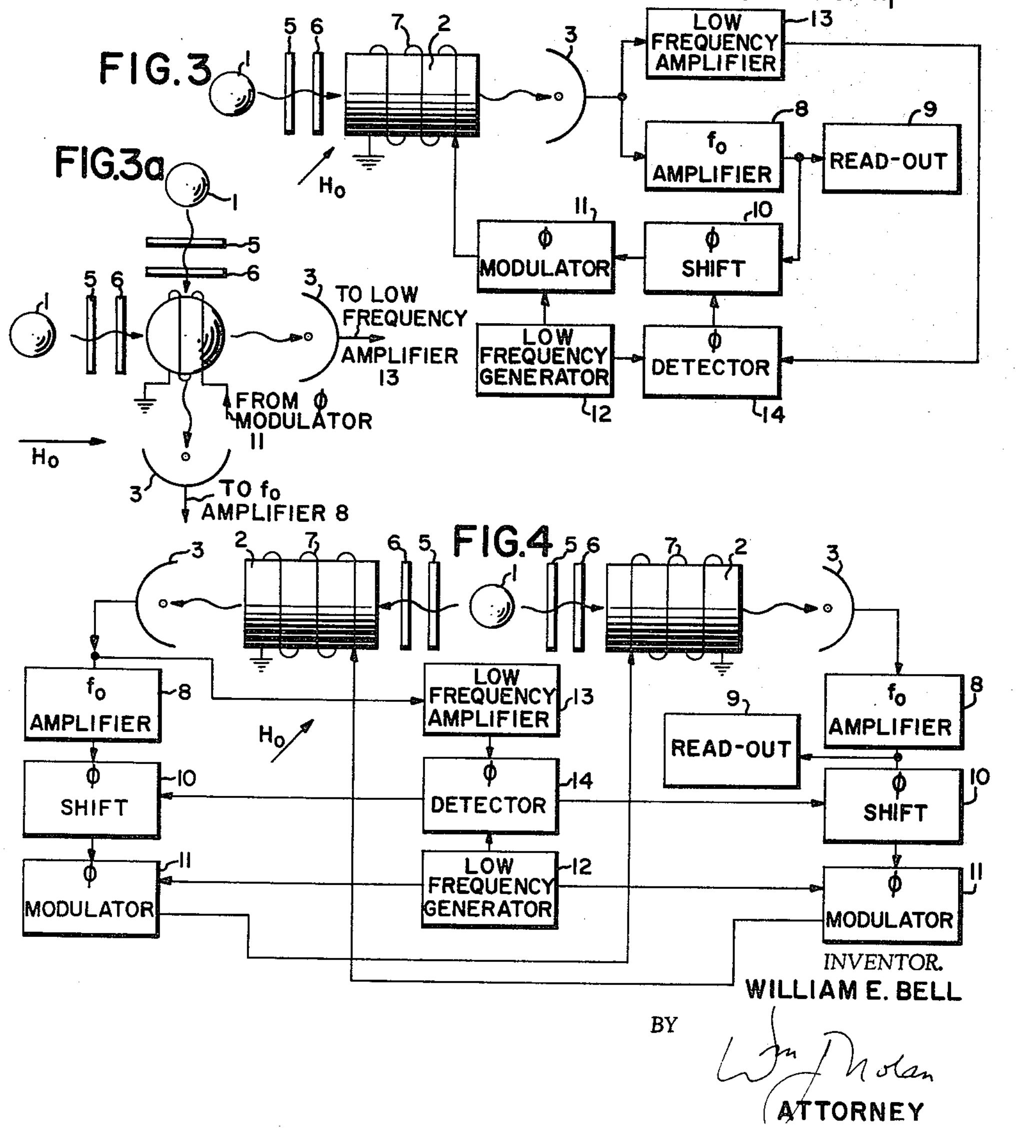
Figure 5:
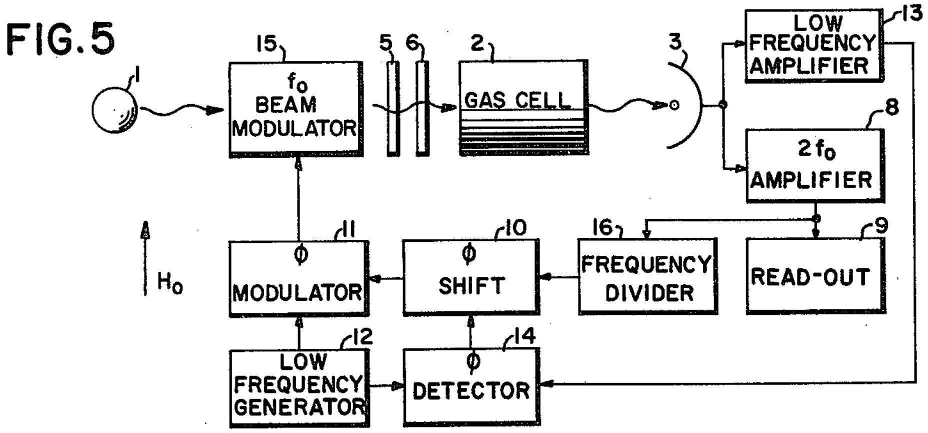
Figure 6:
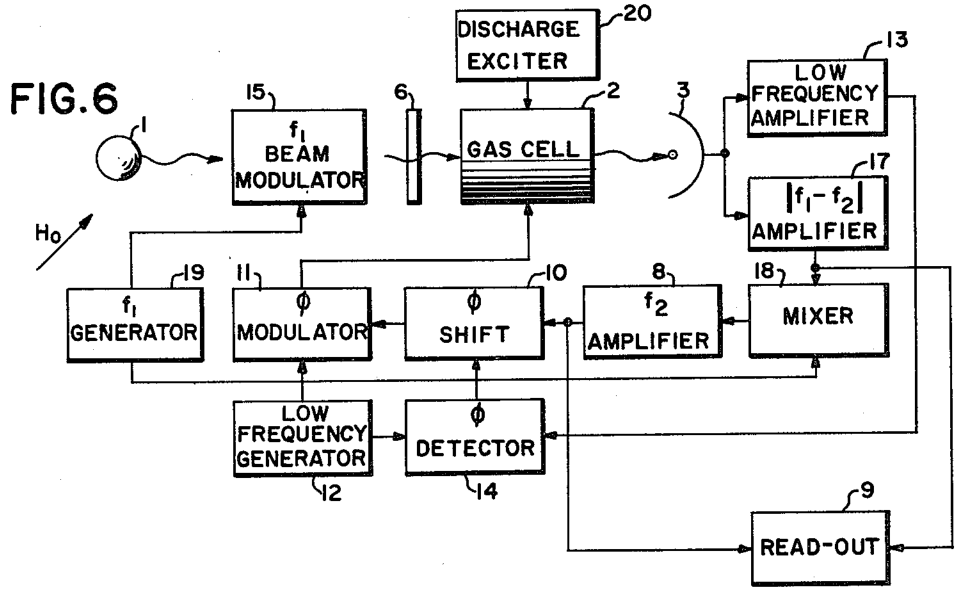

These and other features and advantages of the present invention will be more apparent after a perusal of the following specification taken in connection with the accompanying drawings, wherein FIG. 1 is a generalized block diagram of a quantum self-oscillator utilizing optical detection, FIG. 2 is a plot of certain phase and amplitude relations in a quantum self-oscillator using optical detection, FIG. 3 is a schematic and block diagram of a gas cell magnetic resonance magnetometer in accordance with the present invention, FIG. 3A illustrates a modification for the magnetometer of FIG. 3, FIG. 4 is another embodiment of a magnetometer in accordance with the present invention utilizing a cross-coupled gas cell oscillator, FIG. 5 is another embodiment of a magnetometer in accordance with the present invention utilizing optically driven resonance, and FIG. 6 is still another embodiment of a magnetometer in accordance with the present invention utilizing both optically driven and directly-coupled resonance.

Referring to FIG. 1, a beam of optical radiation from lamp 1 passes through an absorbing sample 2 of quantum mechanical particles having a characteristic magnetic resonance transition frequency, and is intercepted by a photocell 3. The photocell thereby generates a current which is applied to the sample, via feedback circuit 4, in the form of a magnetic field $H_1$. Any component in the output of the photocell which generates a field $H_1$ at the magnetic resonance frequency of the sample will induce coherent transitions therein which serve to modulate the intensity of the transmitted radiation. The frequency of this intensity modulation is determined by the transition frequency of the sample and may, for example, be at the transition frequency or some linear function thereof. This intensity modulation generates a signal in the photocell 3 at the frequency thereof which is applied to the sample 2 in the form of an alternating magnetic field at the proper frequency for maintaining resonance transitions. Thus, the process is regenerative and maintains the system in a condition of self-oscillation at the resonance frequency.

As in any oscillator, it is necessary that there be a zero net phase shift around the closed loop 2, 3, 4 at the frequency of oscillation. If the phase shift through any element should change a small amount so that the condition of zero net phase shift is not met at the exact resonance transition frequency, then the phase shift between the alternating magnetic field $H_1$ applied to the sample 2 and the intensity modulation of the light which energizes photodetector 3 will undergo a compensating change in order to maintain the condition of oscillation at a slightly different frequency. This can readily be seen from the light modulation phase plot (solid line) of FIG. 2. At the exact resonance frequency $f_0$, this phase is at some reference value $\phi_0$. If a small phase shift occurs, the compensating change of phase $\Delta\phi$ required to maintain oscillation undesirably changes the oscillation frequency $f$ by an amount $\Delta f$.

In practice, such phase shifts may be caused by (1) a change in the spatial orientation of the light beam, or (2) by frequency range variations in the phase characteristics of the photodetector and feedback circuit. If, for example, the oscillation frequency is used as a measure of magnetic field intensity, the first type of phase shift results in a heading error (an apparent change in field intensity as the light beam is rotated in a constant intensity field), and the second type of phase shift results in a non-linear dependence of the oscillation frequency on field intensity thereby necessitating individual instrument calibration.

The present invention overcomes these problems by introducing a variable phase shifter in the oscillation loop which is controlled in accordance with the average intensity of optical radiation passing through the sample. As can be seen from the dashed curve in FIG. 2, the average light intensity reaching photodetector 3 experiences a sharp minimum (or, in some cases, a sharp maximum) at the center resonance frequency $f_0$. Thus, maintaining the phase shifter at a value which results in minimum (or maximum) transmitted light intensity insures that oscillation takes place at the exact resonance frequency.

A magnetometer embodiment of the present invention is shown in FIG. 3 wherein the lamp 1 provides the optical resonance radiation of one of the alkali metals, for example, and the gas cell 2 is filled with the vapor of the same alkali metal preferably mixed with an inert buffer gas. Utilizing a suitable lens system (not shown), the beam from the lamp 1 is directed at an acute angle (preferably 45°) to an external unidirectional field $H_0$ (for example, the earth's field), and passes through an interference filter 5 which removes the $D_2(S_{1/2} \rightarrow P_{3/2})$ line from the resonance radiation and a circular polarizer 6 before passing through the intensity modulating gas cell 2 and impinging on the photocell 3. Since the polarized and filtered radiation cannot be absorbed by the gas cell atoms in a magnetic energy sublevel in which the magnetic moments of the atoms point in a certain preferred direction relative to the field $H_0$, it results in that a net magnetic moment or magnetization is built up in the gas cell by a process known as "optical pumping" wherein atoms in the absorbing sublevels are raised to an optically excited state and then fall back into the non-absorbing sublevel.

The coil 7 encircles the gas cell 2 to provide an alternating magnetic field therein. When the frequency of this field coincides with the frequency separation between magnetic sublevels, coherent transitions are induced which may be considered as corresponding to a precession of the net magnetic moment of the gas cell about $H_0$ at the transition frequency. This magnetic moment has a component which alternately points one way and then the other with reference to the light beam axis so that the atoms in the excessively populated sublevel become alternately absorbing and then non-absorbing. As a result, the light passing from the gas cell is characterized in that it is intensity modulated at the precession or transition frequency. This intensity modulation generates a signal in photocell 3 at the precession frequency which is amplified by amplifier 8 and fed back to the coil 7 in the form of an alternating magnetic field which maintains forced precession thereby establishing self-sustained oscillation at the precession frequency. This frequency is read out by any suitable device 9 to provide an indication of the intensity of field $H_0$. For example, the resonance precession frequency $f_0$ in rubidium vapor varies by 4.66 cycles per gamma of field intensity when enriched in the isotope $Rb^{85}$ and by 7.00 cycles per gamma when enriched in the isotope $Rb^{87}$.

The feedback loop is additionally provided with an electronically variable phase shifter 10 and a phase modulator 11. In practice, the function of blocks 10 and 11 may be performed by the same phase variable unit, if desired. Many devices for performing either or both of the functions of blocks 10 and 11 are, of course, well known in the art. The phase modulator 11 is driven at a low, for example, audio, frequency by generator 12 to provide a small modulation $\delta\phi$ in the phase shift through the gas cell which is necessary to maintain oscillation. As seen in FIG. 2, this results in a frequency modulation $\delta f$ of the oscillation frequency $f$ and in an intensity modulation $\delta I$ of the average light intensity reaching photocell 3. This intensity modulation $\delta I$ which is at the frequency of generator 12 has an amplitude that increases with increasing deviation of the center oscillation frequency from the resonance frequency $f_0$, and a phase which reverses as the deviation passes from one side of the resonance frequency to the other. A low frequency signal is thus developed in the photocell circuit which is amplified by amplifier 13 and applied to a phase sensitive detector 14 which receives a reference signal from generator 12. The output of the phase detector will then be a D.-C. signal of the proper sign and phase to drive the phase shifter 10 to a value at which the output of amplifier 13 is nulled, thereby insuring that the oscillation frequency $f$ coincides with the resonance frequency $f_0$.

To minimize orientation dependence, the coil 7 is preferably wound coaxially about the light beam. In this case the gas cell resonance phase shift $\phi_0$ is 90°, and the photocell 3, amplifier 8 and phase shifter 10 combine to to introduce the compensating 90° phase shift required for the zero net phase shift oscillation condition at $f_0$.

It will be noted that the lamp of FIG. 3 performs the function of optically pumping the vapor of gas cell 2 and also serves in the monitoring of the precession of the magnetic moment therein. The pumping function may be attributed to the propagation direction component of the light beam along $H_0$ and the monitoring function to the propagation direction component at right angles thereto. If desired, a separate beam and photocell may be used for each function as shown in FIG. 3A.

FIG. 4 shows a magnetometer embodiment in which oppositely directed beams are passed through separate gas cells 2. The intensity modulation due to each gas cell is cross-coupled to the coil 7 encircling the opposite gas cell to complete the oscillating loop. As described in U.S. patent application Serial No. 62,480, filed October 13, 1960, and assigned to applicant's assignee, abandoned in favor of Serial No. 250,460, filed January 7, 1963, such a cross-coupled arrangement has the advantage of permitting the system to continue in oscillation when the instrument is rotated from one magnetic hemisphere to the other, and also of reducing heading errors due to asymmetries in the resonance line. As shown, a phase shifter 10 and phase modulator 11 is symmetrically included in series with each coil 7. A simpler, though somewhat less sensitive, arrangement would be omit one pair of the units 10 and 11.

The specific embodiments described up to this point have all induced coherent transitions by applying an alternating field directly to the modulating sample at the transition frequency. Such transitions may also be induced by modulating the intensity of the irradiating light at the transition frequency; see 6 Physical Review Letters, 280 (March 15, 1961), 623 (June 1, 1961) and U.S. patent application Serial No. 95,581, filed March 14, 1961, and assigned to applicant's assignee, for a detailed explanation of the phenomena involved. A magnetometer embodiment utilizing such optically driven resonance is shown in FIG. 5.

In FIG. 5, the beam from lamp 1 (which is preferably directed at right angles to $H_0$ when no signal is directly coupled to the gas cell) is moduated prior to irradiating the gas cell 2 by a device 15 which may, for example, be a mechanical light chopper or a circuit for modulating the excitation power for the lamp 1. Any component of intensity modulation at the magnetic resonance frequency will effect coherent transitions in the gas cell 2. These transitions, in turn, give rise to an intensity modulation at the transition or precession frequency $f_0$, and also at twice that frequency $2f_0$. Detection of the $f_0$ component is usually inconvenient, as the large masking effect of the lamp modulation requires the use of a special device such as bridge circuit. Thus, in FIG. 5, the $2f_0$ component is detected and selectively amplified in amplifier 8. The frequency of this signal is then divided in half by frequency divider circuit 16 and applied through the phase shifter 10 and modulator 11 to drive the beam modulator 15 at the resonance frequency $f_0$ and thereby maintain self-oscillation. As in the previous embodiment the oscillation frequency is stabilized at $f_0$ by virtue of the low frequency modulation control loop comprising circuit elements 12, 11, 13, 14, 10.

FIG. 6 shows a magnetometer embodiment in which transitions are induced by applying an alternating signal to a beam modulator and also directly to the gas cell. As pointed out in the above-cited patent application Serial No. 95,581, if the beam is intensity modulated at a frequency $f_1$ and a signal at a second frequency $f_2$ is directly coupled to the gas cell, both $f_1$ and $f_2$ being in the vicinity of resonance that is, within about three linewidths or less of the resonance frequency $f_0$), then a photocell component at the difference frequency $|f_1-f_2|$ is generated. This component is applied via amplifier 17 to a mixer 18 where it is mixed with a signal from a stable generator 19 which drives the beam modulator 15. The output of mixer 18 is at the difference frequency $f_2$ so that the regenerative condition for oscillation is established. Either the oscillation frequency $f_2$ or the photocell signal frequency $|f_1-f_2|$ may be supplied to the read-out unit 9.

In this example, the oscillating loop is controlled by a low frequency loop comprising circuit elements 12, 11, 13, 14, 10 to stabilize the oscillation frequency $f_2$ at the resonance frequency $f_0$. Alternatively, the stable generator 19 may be used to supply the frequency $f_2$ to the gas cell, and the oscillation and control loops used to supply the $f_1$ signal to the beam modulator 15, $f_1$ in this case being the frequency which is stabilized at the value $f_0$.

One important feature of the system of FIG. 6 is that the photocell need only respond to a difference frequency. This is of particular interest in the case of high resonance frequency where it may be difficult to obtain a photocell which will effectively follow a variation in beam intensity at this frequency. The system of FIG. 6 is particularly adapted for use with metastable $2^3S_1$ helium atoms in the gas cell 2, the magnetic resonance frequency of these atoms being 28 cycles/gamma. A discharge exciter 20 is provided to excite helium gas atoms in the cell 2 to the metastable state, and the interference filter usually used for alkali optical resonance radiation is omitted in the case of the helium optical resonance radiation from helium lamp 1. In general, it may be noted that any of the various embodiments described as using alkali metal vapor may be used with helium gas by making the same modifications.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A quantum oscillator comprising: a sample of matter characterized by a resonance line for quantum transitions between quantum mechanical states of atoms of said sample; means for irradiating said sample with optical radiation so that a plurality of said sample atoms are raised from an optically absorbing quantum mechanical state to an optically excited quantum mechanical state; means responsive to optical radiation passing through said sample without absorption for developing a first signal at a frequency which depends on the frequency of said quantum transitions and also for developing a second signal which depends on the average intensity of optical radiation passing through said sample; means responsive to said first signal for developing a feedback signal which regeneratively induces quantum transitions in said sample, thereby establishing a condition of self-oscillation at said transition frequency; and means responsive to said second signal for stabilizing said oscillation frequency at the resonance frequency of said transitions.

2. A quantum oscillator according to claim 1 including means for varying the phase of said feedback signal in accordance with the intensity of said second signal.

3. A quantum oscillator according to claim 1 including means for modulating the phase of said feedback signal, said stabilizing means including means responsive to intensity variations in the detected optical radiation which are at the frequency of said phase modulation.

4. A quantum oscillator according to claim 1 wherein said sample is a gas or vapor and said irradiating optical radiation is the optical resonance radiation of said gas or vapor.

5. A quantum oscillator according to claim 4 including means for positioning said sample in a magnetic field to therby create magnetic sublevels of atoms of said gas or vapor which are in an optically absorbing state, said transitions being transitions between said magnetic sublevels.

6. A quantum oscillator according to claim 5 wherein said irradiating optical radiation has such spectral characteristics as to experience differential sublevel absorption.

7. A quantum oscillator according to claim 6 wherein the optical radiation passed through said cell is the irradiating optical radiation which has passed through said cell without absorption.

8. A quantum oscillator according to claim 7 wherein said sample contains alkali atoms.

9. A quantum oscillator according to claim 7 wherein said sample contains helium atoms excited to an optically absorbing metastable state.

10. A quantum oscillator according to claim 7 including means for circularly polarizing said irradiating optical radiation.

11. A quantum oscillator according to claim 10 wherein said sample contains alkali atoms mixed with an inert buffer gas and including means for filtering out the $D_2$ line of said resonance radiation before irradiating said absorption cell.

12. A quantum oscillator according to claim 5 including means for positioning said sample in a unidirectional magnetic field, the frequency of said transitions varying substantially linearly with the intensity of the unidirectional magnetic field at said sample, and further including means responsive to said self-sustained oscillation for monitoring said magnetic field.

References Cited by the Examiner

UNITED STATES PATENTS 3,103,621 9/63 Fraser ............... 324—0.5

FOREIGN PATENTS 875,242 8/61 Great Britain.

OTHER REFERENCES

Andres: I.R.E. Transactions on Military Electronics, MIL–3, No. 4, October 1959, pp. 178 to 183 incl.

Mansir: Electronics, vol. 33, Aug. 5, 1960, pp. 47 to 51 incl.

Bender: Colloque Ampere 8, Archives des Sciences, vol. 13 (Special), September 1960, pp. 620 to 628.

Arditi et al.: Physical Review, vol. 124, No. 3, Nov. 1, 1961, pp. 800 to 809 incl.

CHESTER L. JUSTUS, *Primary Examiner.*

MAYNARD R. WILBUR, *Examiner.*